United States Patent Office 3,334,155
Patented Aug. 1, 1967

3,334,155
PRODUCTION OF COPOLYMERS OF UNSATURATED POLYESTER AND ETHYLENICALLY UNSATURATED MONOMERS
Heinrich Hopff and Eduard Kleiner, Zurich, Switzerland, assignors to Deutsche Gold- und Silber-Scheideanstalt vormals Roessler, Frankfurt am Main, Germany
No Drawing. Filed June 29, 1964, Ser. No. 378,997
Claims priority, application Germany, June 28, 1963, D 41,853
4 Claims. (Cl. 260—861)

The present invention relates to an improved process for the copolymerization of unsaturated polyesters with ethylenically unsaturated monomers using formyl phenyl acetic acid derivatives.

It is known that unsaturated polyesters which still contain active double bonds can be cross-linked by oxidation, polymerization or copolymerization. The copolymerization of unsaturated polyesters with vinyl compounds and especially styrene is of substantial importance as such copolymerization in the presence of radical forming catalysts leads to clear three dimensional copolymers. Such products can be processed by known methods, such as, for example, casting or molding under low pressure. In general, peroxides are used as the radical forming catalysts. The use of certain aldehydes, ketones or diketones as catalysts for the copolymerization of unsaturated polyesters with vinyl monomers has been recently proposed.

According to the invention it was found that certain α-formyl phenyl acetic acid derivatives serve as excellent catalysts for the copolymerization of unsaturated polyesters with liquid monomers containing a terminal

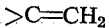

group. Such α-formyl phenyl acetic acid derivatives are of the following formula

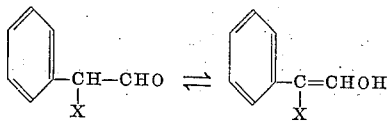

in which X represents —CN, —COOR$^1$, —CONHR$^1$ or a —CONR$^2$ group wherein R$^1$ signifies an alkyl group with 1–10 carbon atoms, aryl, aralkyl or alkaryl and R$^2$ signifies alkylene of 5 to 12 carbon atoms.

The catalysts employed according to the invention provide advantages over the previously employed catalysts in that the copolymerization proceeds uniformly and without substantial temperature rise after a very short gelling period. In addition, only very small quantities of the new catalysts need be employed. Furthermore, the presence of atmospheric oxygen in general does not hinder the progress of the polymerization to completion.

Illustrative examples of suitable derivatives of α-formyl phenyl acetic acid, for instance, are the methyl, ethyl, propyl, butyl, benzyl, phenyl or phenyl methyl esters of such acid, the amides and anilides of such acid, such as, the methyl, ethyl or propyl amides or the anilide, the piperidide or the hexamethylene imide of such acid, as well as α-formyl phenyl acetic acid nitrile. The latter has proved to be an exceptionally suitable catalyst.

The unsaturated polyesters concerned, for example, can be the condensation products of α,β-unsaturated dicarboxylic acids, such as maleic acid, fumaric acid, itaconic acid, tricarballylic acid or their anhydrides, partial esters, mixed esters or ester mixtures with polyalcohols, such as saturated or unsaturated glycols, for example, ethylene glycol, mono-, di- or triethylene glycol, tri- or hexamethylene glycol. It is possible to use saturated dicarboxylic acids in the place of the unsaturated dicarboxylic acids. Such replacement can be complete if the other ester component is an unsaturated polyalcohol, otherwise such replacement may only be partial. Adipic acid, phthalic acid and/or terephthalic acid as such or in the form of their anhydrides, partial esters or ester mixtures preferably are used as the saturated carboxylic acids.

The preferred >C=CH$_2$ group containing liquid monomer used according to the invention is styrene in which the polyesters can be dissolved. However, other of such ethylenically unsaturated monomers can also be used, such as, for example, polyallyl esters, such as diallyl phthalate, vinyl esters, such as viny acetate, vinyl propionate, acrylic or methacrylic acid esters, such as the methyl, aryl or butyl esters, vinyl ethers, acrylonitrile, butadiene, halogen substituted butadienes, such as chloroprene and diallyl maleate.

In general, mixtures of 60 to 70 parts by weight of polyester and 40 to 30 parts by weight of >C=CH$_2$ group containing monomer are employed. the copolymerization initiates after incorporation of the catalyst.

The quantity of catalyst employed is between 0.0020% by weight to 2.0% by weight with reference to the polyester. They exhibit their best action at normal pressure at polymerization temperatures between 60 and 120° C. At elevated pressures the polymerization can also be carried out at temperatures around 140–160° C. The catalyst compounds can be used individually or in admixture with each other.

The following examples will serve to illustrate the process according to the invention. In such examples the proportions are given by weight unless otherwise specified.

EXAMPLE 1

500 parts of a standard polyester obtained from 1 mol (98 parts) of maleic acid anhydride, 1.6 mol (237 parts) of phthalic acid anhydride, 1.6 mol (99 parts) of ethylene glycol and 1 mol (106 parts) of diethylene glycol with an acid number of 25.7 were mixed with 250 parts of freshly distilled styrene at 80° C. to obtain a polyester styrene solution with an acid number of 17.2.

20 g. portions of this polyester solution were stirred together with the quantities of the catalysts indicated in Table I. The catalysts were used as such or as suspensions or solutions in the usual plasticizers, such as phthalates, phosphates, acylic dicarboxylic acid esters and the like. The copolymerization was effected at 100° C. or respectively 80° C. (see benzoyl peroxide).

The term "gelling period" is employed herein to signify the time which elapsed in minutes between the start of the copolymerization and the time when the reaction mass no longer flows together when a glass rod is pulled out therefrom.

The "peak temperature" is the highest temperature attained during the polymerization and the "curing period" signifies the elapsed time between the start of the polymerization and the time when the peak temperature is reached.

TABLE I

| Catalyst | Catalyst Quantity in Weight Percent | Gelling Period in Min. | Peak Temperature in °C. | Curing Period in Min. |
| --- | --- | --- | --- | --- |
| α-Formyl phenyl acetic acid nitrile | 1.0 | 3.75 | 118.5 | 17 |
| | 0.5 | 4.0 | 117 | 18 |
| | 0.25 | 4.0 | 117 | 20 |
| | 0.10 | 4.25 | 116 | 20 |
| | 0.05 | 4.5 | 114 | 22 |
| | 0.025 | 5.5 | 113 | 23 |
| | 0.0025 | 11.5 | 108 | 25 |
| α-Formyl phenyl acetic acid methyl ester | 1.0 | 4.5 | 121 | 17 |
| | 0.5 | 6 | 119 | 19 |
| | 0.25 | 8 | 116 | 20 |
| | 0.10 | 14 | 109 | 27 |
| α-Formyl phenyl acetic acid anilide | 2.0 | 8.5 | 114 | 16 |
| Benzoyl peroxide (at 80° C.) | 2.0 | 5.5 | 228 | 7 |
| | 1.0 | 7.75 | 218 | 10 |
| | 0.5 | 11.5 | 210 | 15 |

As can be seen from such table the catalysts employed according to the invention provide nearly always for shorter gelling periods and above all lower peak temperatures. These results are especially important when such copolymerization is carried out on a technical scale as in view of the lower peak temperatures the copolymerization is easier to control and as rapid polymerization can be avoided crack and bubble free copolymerization products can be obtained.

The copolymers produced in all cases were glass clear and uncolored.

When fillers, such as, for example glass fibers are added to the mixture of the polyester and the $>C=CH_2$ group containing monomer either before or during the polymerization, it has been found expedient to replace the nitrile or ester of α-formyl phenyl acetic acid by their alkali metal or heavy metal salts. The sodium salt of the nitrile compound is especially effective but the copper, cobalt or nickel salts may also be used effectively. The latter three, however, have their characteristic color. The same metal salts of the ester compounds also are effective. In some instances the derivatives of α-formyl phenyl acetic acid and their salts can be in conjunction with each other.

EXAMPLE 2

20 g. portions of the same polyester-styrene solution as used in Example 1 were polymerized with the quantities of the metal salts of nitrile compounds of the formula

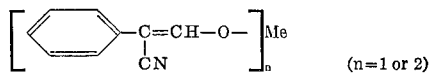

given in Table II at 100° C.

TABLE II

| Metal salt of the nitrile | Quantity in wt. percent | Gelling period in minutes |
| --- | --- | --- |
| Sodium | 0.1 | 4.5 |
| | 0.05 | 4.5 |
| | 0.01 | 7.5 |
| | 0.025 | 11 |
| Cobalto | 0.05 | 9.5 |
| Cupric | 0.05 | 10.5 |
| Nickel | 0.05 | 12.0 |

EXAMPLE 3

20 g. portions of the same polyester styrene solution as used in Example 1 were polymerized at 100° C. with 0.25% of the metal salts of the methyl ester compound of the formula

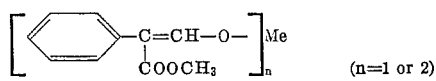

given in Table III.

TABLE III

Metal salt of the methyl ester compound: | Gelling period in minutes
- Sodium _____ 11.0
- Cobalto _____ 11.5
- Nickel _____ 13.0
- Cupric _____ 45

It was furthermore found that in addition to the named derivatives of α-formyl phenyl acetic acid themselves and their metal salts, their hydrate and alcoholates are also effective as can be seen from the following example.

EXAMPLE 4

20 g. portions of the same polyester styrene solution as used in Example 1 were mixed with 1% of the hydrate and alcoholates of α-formyl phenyl acetic acid piperidide shown in Table IV and polymerized at 80° C.

TABLE IV

Hydrates and alcoholates α-formyl phenyl acetic acid piperidide: | Gelling period at 80° C. in minutes
- Hydrate _____ 3.5
- Methyl alcoholate _____ 4.5
- Ethyl alcoholate _____ 4.25

As already indicated the present invention is not limited to copolymerization of polyesters with styrene as comonomer but that it is also effective with other monomers containing a $>C=CH_2$ group. The following example illustrates the activity of α-formyl phenyl acetic acid methyl ester in such other copolymerizations.

EXAMPLE 5

The same standard polyester as used in Example 1 was employed with the various monomers indicated in Table V in a polyester to monomer ratio by weight of 3:1.

TABLE V

| Monomer | Bath Temperature, °C. | Gelling period with 2 wt. percent formyl-phenyl acetic acid methyl ester |
| --- | --- | --- |
| Methyl methacrylate | 70 | 14–15 minutes. |
| Methyl acrylate | 70 | 15–16 minutes. |
| n-Butyl acrylate | 70 | 28–30 minutes. |
| Vinyl acetate | 70 | 26–28 minutes. |
| Acrylonitrile | 70 | 19–20 minutes. |

We claim:
1. In a process for the copolymerization of unsaturated polyesters with liquid monomers containing a $>C=CH_2$ group, the step of carrying out such copolymerization in the presence of a catalytically effective amount of at least one α-formyl phenyl acetic acid compound selected from the group consisting of compounds of the formula

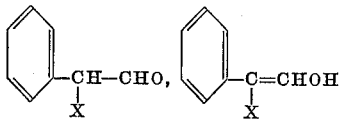

their alkali metal salts, their heavy metal salts, their hydrates and their lower alkanol alcoholates, wherein X is selected from the group consisting of —CN, —COOR¹, —CONHR¹, —CONR² in which R¹ is selected from the group consisting of alkyl with 1 to 10 carbon atoms, aryl, aralkyl and alkaryl and R² is alkylene with 5 to 12 carbon atoms, as the polymerization catalyst.

2. The process of claim 1 in which the quantity of said catalyst is between 0.002 to 2% by weight with reference to the polyester.

3. The process of claim 1 in which said copolymerization is carried out at atmospheric pressure at a temperature between 60 and 120° C.

4. The process of claim 1 in which said copolymerization is carried out under superatmospheric pressure at a temperature between 140 and 160° C.

References Cited

UNITED STATES PATENTS

| | | | |
|---|---|---|---|
| 2,809,183 | 10/1957 | Bader et al. | 260—861 |
| 3,227,779 | 1/1966 | Hopff et al. | 260—861 |
| 3,285,994 | 11/1966 | Luthauser et al. | 260—861 |

FOREIGN PATENTS

| | | |
|---|---|---|
| 1,150,805 | 6/1963 | Germany. |

MURRAY TILLMAN, *Primary Examiner.*

G. T. GOOLKASIAN, *Assistant Examiner.*